Jan. 24, 1939.  C. E. QUINN  2,144,809
LIQUID COOLER
Filed April 12, 1938   2 Sheets-Sheet 1

INVENTOR.
Clara E. Quinn
BY Darby & Darby
ATTORNEYS.

Jan. 24, 1939.  C. E. QUINN  2,144,809
LIQUID COOLER
Filed April 12, 1938  2 Sheets-Sheet 2

INVENTOR.
Clara E. Quinn
BY Darby & Darby
ATTORNEYS.

Patented Jan. 24, 1939

2,144,809

UNITED STATES PATENT OFFICE 2,144,809

LIQUID COOLER

Clara E. Quinn, St. Petersburg, Fla.

Application April 12, 1938, Serial No. 201,532

3 Claims. (Cl. 62—151)

This invention is for improvements in liquid coolers as, for example, refrigerating devices particularly employed for cooling milk.

The general object of the invention is to provide in simple structural form, and therefore inexpensive, a cooling device for milk which may be easily cleaned and which is simple to use.

An important object of the invention is to provide a structure in a device of this type which may be easily disassembled so that all parts thereof may be quickly and thoroughly cleaned and sterilized.

Other objects of the invention will be apparent from the following detailed description of the construction as illustrated in the drawings.

This invention resides substantially in the combination, construction, arrangement and relative location of parts, all in accordance with the following disclosure.

In the accompanying drawings.

Figure 1:
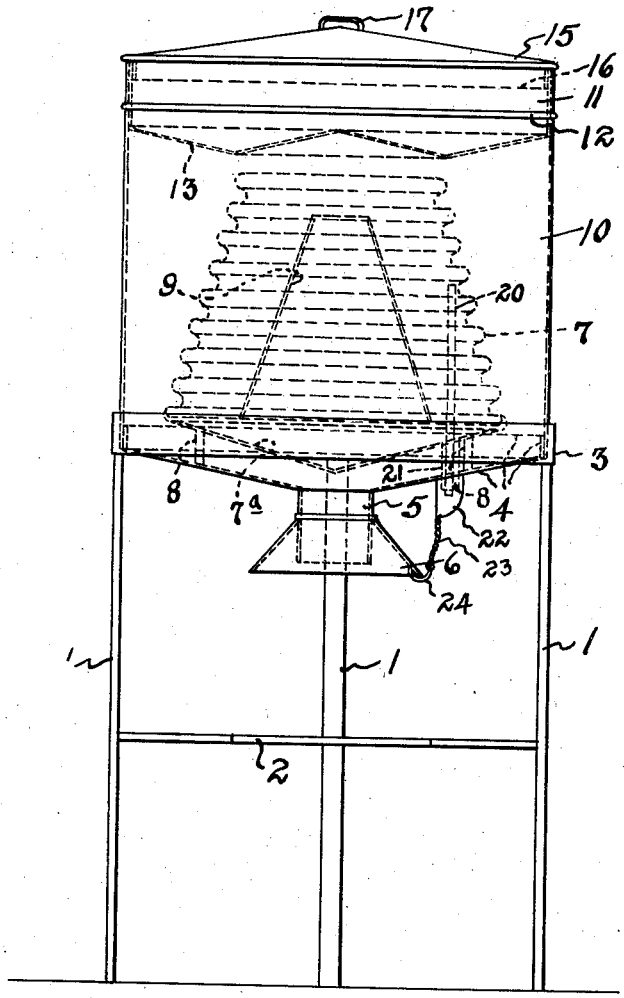
Figure 1 is an elevational view of the device.
Figure 2:
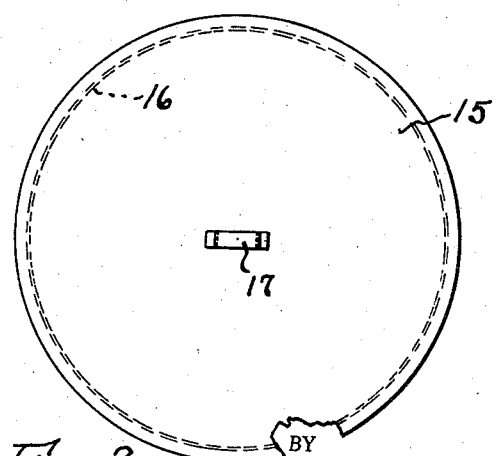
Figure 2 is a top plan view thereof.

It is a well known scientific fact that the bacteria count in milk rapidly increases at ordinary temperatures, immediately after the time when the milk is taken from the cow.

It is also well known that this increase in bacteria count may be greatly retarded if the milk is quickly chilled immediately after being taken from the cow. This safeguard is not practiced as frequently as good health standards require because of the unavailability and in some cases unsuitability of such apparatus as is available.

The practical necessity in this field is for a simple relatively inexpensive structure which because of these factors will recommend it for use. Furthermore, any practical device of this type should be readily completely taken apart so that it may be thoroughly cleaned, otherwise it defeats its own purpose.

In a general sense the invention herein disclosed eliminates the disadvantages and insures the advantages explained above.

In the drawings the device is shown comprising a stand made up of a ring 3 having an internal and radially extending flange at its bottom edge. This ring is supported in a horizontal position at a suitable height by means of a series of standards or legs 1 secured thereto in any suitable manner. The legs are braced and strengthened by means of a ring-like member 2 which interconnects them and is constructed so as to receive and position a milk can of the type commonly employed.

In this ring and resting on the flange is a circular pan 4 having a truncated conical bottom, as is clear in Figure 1. At the center it is provided with a downwardly projecting tube 5 which, in turn, is surrounded and protected by an outwardly flaring skirt 6, slidably mounted thereon. Setting upon the bottom of the pan 4, by means of integral legs 8, is a conical metal pan 7a having a condensate drain tube 21, as is clearly shown. The refrigerant container or cooling unit is a truncated conical metal casing 7 resting on the pan 7a at its bottom wall 7b and having a corrugated wall as shown or similar thereto. This wall results from a series of alternately projecting and receding annular rings which may be formed from a single sheet of metal in an obvious manner. Mounted on the flat wall 7b is a truncated conical member 9 of less diameter, as is clear from Figure 1. At 20 is a drain tube to carry off the excess water when water ice is used. This tube is concentric with tube 21.

Surrounding the cooling unit and setting in the ring 3 is a cylindrical open-ended tubular casing member 10.

Figure 3:
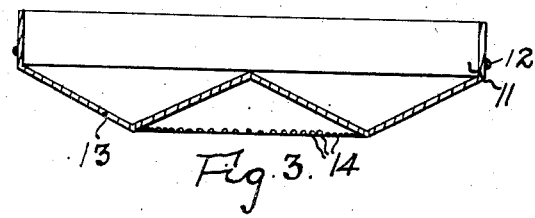
Figure 3 is a vertical central cross-sectional view through the fluid receiving pan.
Figure 4:
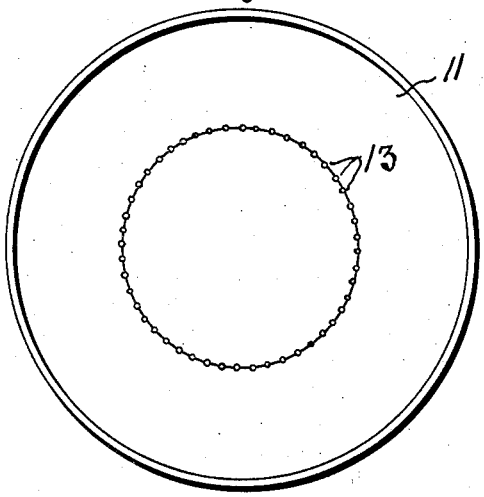
Figure 4 is a top plan view thereof.
Figure 7:
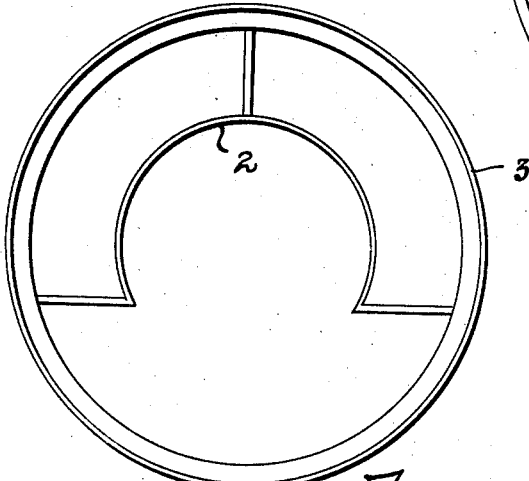
Figure 7 is a top plan view of the span for the remainder of the apparatus.
Figure 5:
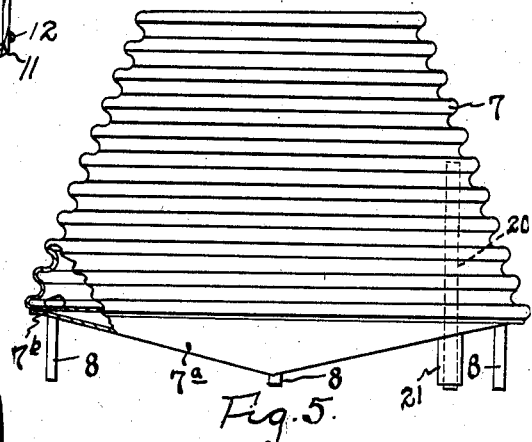
Figure 5 is an elevational view of the cooling device showing a portion thereof in cross-section.
Figure 6:
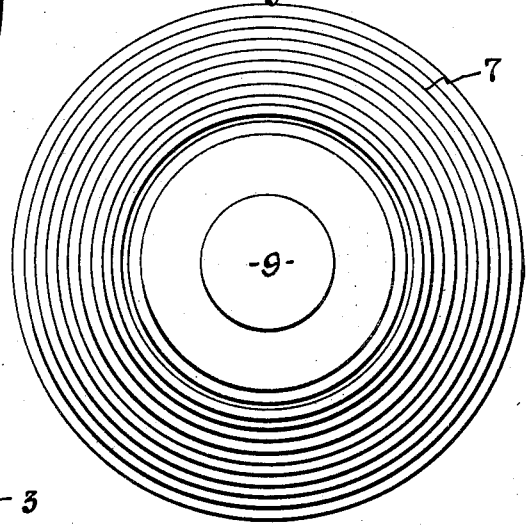
Figure 6 is a top plan view of the cooling device.

Supported on top of the casing member 10 is a pan 11 comprising a cylindrical wall portion open at the top and closed by a bottom wall 13 comprising a peripheral truncated conical portion 13 and an upwardly projecting conical portion, as is clear from Figures 3 and 4. A series of fine holes 14 are provided in the circular trough thus formed. The cylindrical portion of the pan is provided either with an integral bead or a ring 12 secured on the surface thereof to properly position it on top of the casing 10.

The pan 4 is provided with a drain tube 22 arranged to drip the water from tubes 20 and 21 onto the milk can when placed under the tube 5.

A suitably shaped cover 15 provided with a flange 16 fits into the upper edge of the pan 11. This cover is provided with a suitable handle 17, as shown.

A chain 23 having a hook 24 is provided to engage and hold the skirt 6 in round position.

In use the parts are assembled as indicated in

Figure 1, with the pan 11 and the cover 15 removed. A suitable refrigerant such as water ice or solid carbon dioxide in the form of small pieces is placed in the space between the corrugated wall of member 7 and the member 9. The member 9 is provided to hold the ice out against the wall 7 to facilitate rapid heat transfer. The pan 11 is then put in place and a quantity of milk to be chilled is poured thereinto and the cover immediately replaced. The milk then trickles through the holes 14 either in small individual streams or a thin curtain, depending upon the shape and proximity of the holes 14, onto the upper end of the corrugated wall 7. It then flows in a thin sheet down over the corrugated wall, being somewhat impeded in its progress by reason of the shape of the wall. In addition the length of this path of travel is increased because of the wall formation, so that by the time it reaches the lower end of the cooling unit 7 it is completely chilled, having lost its heat to the ice through the corrugated wall. It then flows down along the bottom of the conical wall 7a and falls from the lowest point thereof through the tube 5 into the can. The tube 5 is of such dimensions as to fit nicely into the neck of the milk can and the skirt 7 protects the milk against exposure to air and germs. The cold condensate in pan 7a prevents the milk from being warmed. The condensate and ice water are discharged onto the milk can under the apparatus by the drain tube 22.

Of course, desirably, from a manufacturing standpoint, the entire device is made of metal, preferably in sheet form wherever possible. The cooling unit is completely made of a suitable non-corrosive high heat conducting material, such as copper, which may be plated or otherwise coated, if desirable, with a tarnish-proof metal, or may be entirely made thereof.

From the above description it will be apparent to those skilled in the art that the details of construction herein shown for purposes of illustration may be varied without departing from the novel scope of this disclosure. I do not, therefore, desire to be strictly limited to the disclosure as given for purposes of illustration, but rather to the claims granted me.

What I desire to secure by United States Letters Patent is:

1. A device as described including a casing having an outlet at the bottom thereof, a cooling unit supported in said casing having a corrugated wall and adapted to receive water ice, a container mounted on top of said casing having apertures therein for discharging fluid therefrom at a slow rate onto the cooling unit, a drain tube for the cooling unit for maintaining a desired level of water produced by the melting ice while carrying off the excess, and a deflector drain spout into which said drain tube discharges arranged to discharge the water onto a container when placed under said outlet.

2. In a device as described the combination comprising a stand, a container mounted on said stand having a discharge tube in the bottom wall thereof, an open top metallic casing supported in said container on the bottom wall thereof and having a ribbed side wall, said casing being adapted to receive a solid refrigerant, means in said casing for holding the solid refrigerant in engagement with the walls of the casing, a pan removably mounted on the top of said container having a ring of apertures in the bottom wall thereof positioned so as to discharge the contents of the pan onto the ribbed wall of said casing in the form of a sheet at a slow rate, and a removable cover for said pan.

3. In a device as described the combination comprising a stand, a container mounted on said stand having a discharge tube in the bottom wall thereof, an open top metallic casing supported in said container on the bottom wall thereof and having a ribbed side wall, said casing being adapted to receive a solid refrigerant, means in said casing for holding the solid refrigerant in engagement with the walls of the casing, a pan removably mounted on the top of said container having a ring of apertures in the bottom wall thereof positioned so as to discharge the contents of the pan onto the ribbed wall of said casing in the form of a sheet at a slow rate, a removable cover for said pan, and a skirt member slidably mounted on said discharge tube and adapted to fit down over the top of a container placed under the tube.

CLARA E. QUINN.